(12) United States Patent
Faris

(10) Patent No.: US 6,471,438 B2
(45) Date of Patent: Oct. 29, 2002

(54) FLEXIBLE KEY CHAIN HAVING ADHESIVELY ATTACHED CONNECTOR HALVES

(76) Inventor: F. Dale Faris, P.O. Box 2334, Harbor, OR (US) 97415

( * ) Notice: Subject to any disclaimer, the term of this patent is extended or adjusted under 35 U.S.C. 154(b) by 0 days.

(21) Appl. No.: 09/812,991

(22) Filed: Mar. 20, 2001

(65) Prior Publication Data

US 2002/0136594 A1 Sep. 26, 2002

(51) Int. Cl.⁷ .............................................. A44B 15/00
(52) U.S. Cl. ...................... 403/291; 24/114.5; 403/268; 403/372
(58) Field of Search ................................ 403/268, 265, 403/326, 375, 327, 328, 365, 366, 372, 378, 291; 24/114.5

(56) References Cited

U.S. PATENT DOCUMENTS

| | | |
|---|---|---|
| 2,771,768 A | 11/1956 | Tudor |
| 4,653,953 A * | 3/1987 | Anderson et al. ........... 403/265 |
| 4,706,367 A | 11/1987 | Garringer |
| 4,986,457 A | 1/1991 | Faris |
| 5,138,855 A | 8/1992 | Faris |
| 5,509,750 A | 4/1996 | Boike |
| 5,716,160 A | 2/1998 | Lee |
| 5,782,107 A | 7/1998 | Glanz |
| 6,146,049 A | 11/2000 | Faris |
| 6,317,934 B1 * | 11/2001 | Hirokit et al. ............ 24/16 PB |

* cited by examiner

Primary Examiner—Lynne H. Browne
Assistant Examiner—John R. Cottingham
(74) Attorney, Agent, or Firm—Brian R. Rayve

(57) ABSTRACT

Flexible loop assemblies for use variously as key chains, paper ring binders, or as jewelry and a connector for use in such loop assemblies. The loop assemblies comprise a flexible band and a connector. The connector includes respective connector halves each having a bore into which respective mating plugs at opposite ends of the band closely fit. Each of the bores and plugs include an annular groove which radially aligns with the annular groove of the mating plug or bore. Adhesive applied to the plugs and to the bores fills the respective annular grooves and hardens to form respective lock rings which mechanically in addition to adhesively couple the connector halves to the band.

39 Claims, 3 Drawing Sheets

Figure 1:
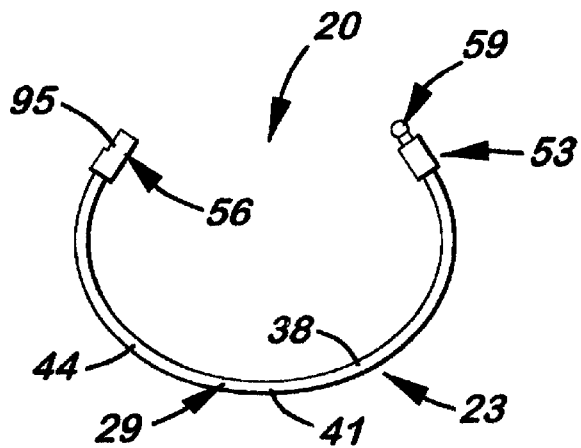

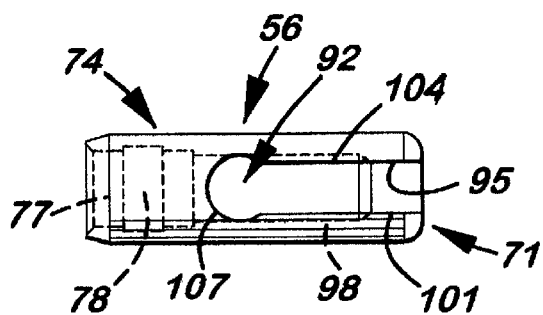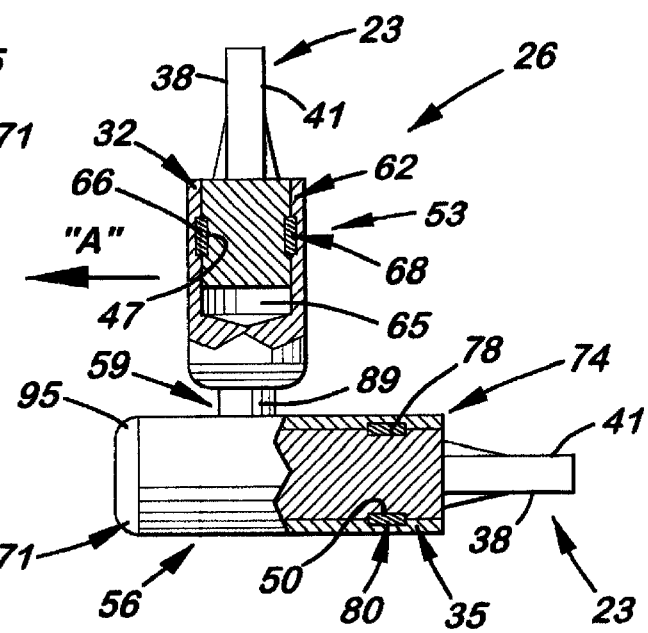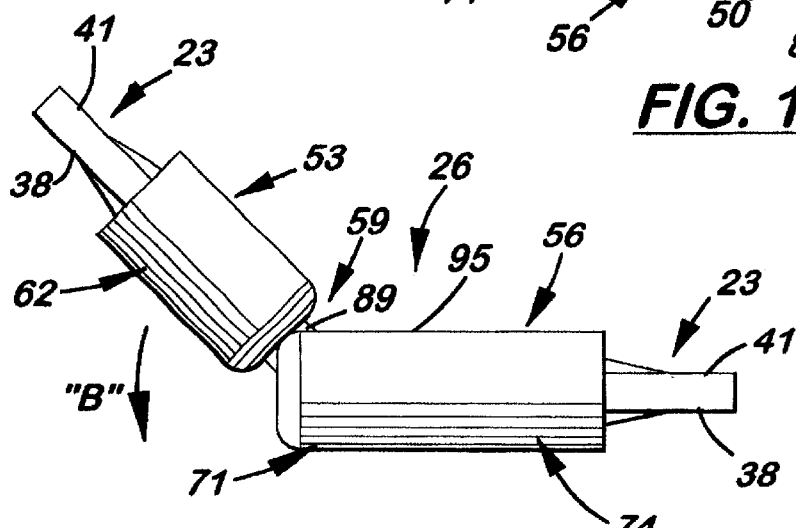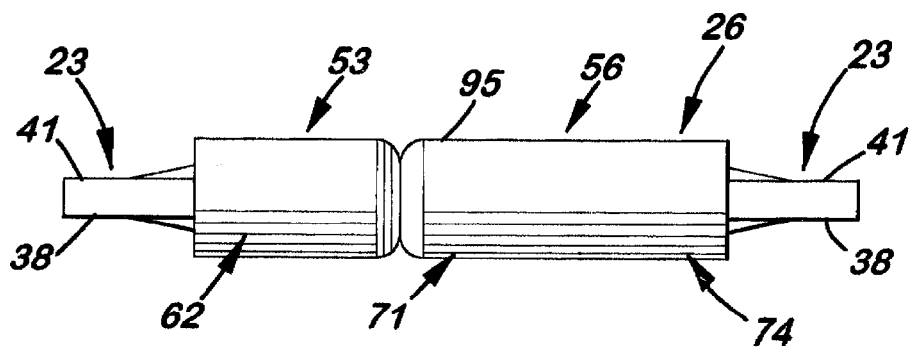
FIG. 12
FIG. 13
FIG. 14
FIG. 15

FLEXIBLE KEY CHAIN HAVING ADHESIVELY ATTACHED CONNECTOR HALVES

BACKGROUND OF THE INVENTION

1. Field

The invention is in the field of flexible connector assemblies having removable or permanently connectable ends, such as key chains and jewelry.

2. State of the Art

Devices which utilize a flexible band such as a length of cable the opposite ends of which connect together by means of ferrules or other such connectors have been used for many years. Such devices include key chains having a length of flexible cable with mating ferrules at opposite ends thereof which can be disconnected to add or subtract keys as well as reconnected for use. Multiple of such devices with the appropriate length of cable can be used to bind together loose leaf pages. Other such devices have ferrules which are permanently connected together.

An example of a device which has ferules which permanently connect together is found in U.S. Pat. No. 4,986,457 ('457 patent) issued to this inventor, the disclosure of which is hereby incorporated by reference. The patent discloses a closed loop cable system primarily designed for preventing the theft of coats on display at retail stores by preventing a person from wearing the coat to subsequently walk out of the store wearing the coat. The system comprises a length of cable which is passed through at least one sleeve of the coat to form a loop. Opposite ends of the cable are provided with mating ferrules crimped thereto which ferrules are subsequently connected and crimped together using a special crimping tool. Upon sale of the coat the special tool has a cutter to cut the cable prior to departure of the customer with the coat. Such system does not allow multiple connection and disconnection cycles due to the crimping, such as needed for key chains, jewelry, and binder rings.

An example of a system which utilizes ferrules which are reconnectable in a linear fashion is found in U.S. Pat. No. 5,138,855 ('855 patent) also issued to this inventor, the disclosure of which is hereby incorporated by reference. The patent discloses a flexible cable having a first ferrule crimped to one end thereof which includes an elongate, bullet shaped plug having a reduced diameter portion. A second ferrule crimped to the opposite end of the cable comprises a pair of tubular members, one having an inwardly disposed lip defining a socket and the other tubular member fitting inside the first tubular member with the end thereof spaced from the lip with a retaining ring disposed therein. When the plug is forced into the socket, the bullet shape thereof expands the retaining ring until the reduced diameter portion of the plug reaches the retaining ring wherein the retaining ring can contract to hold the plug in the socket.

An example of a system which utilizes ferrules which are reconnectable in a twisting or torsional fashion is found in U.S. Pat. No. 2,771,768 ('768 patent) issued to B. E. Tudor, the disclosure of which is hereby incorporated by reference. The patent discloses a flexible, torsionally resilient cable having a first ferrule crimped to one end thereof terminates in a generally hollow end provided with an inwardly directed locking shoulder. A second ferrule crimped to the opposite end of the cable terminates in an enlarged semicircular head adapted to be inserted within the generally hollow front connection portion past the locking shoulder and rotatably twisted against the torsional resiliency of the cable to lock.

An example of a system which utilizes machined connector halves which are reconnectable in a linear fashion is found in U.S. Pat. No. 6,146,049 ('049 patent) issued to this inventor, the disclosure of which is hereby incorporated by reference. The connector includes elongate cylindrical mating male and female connector halves each having respective end bores into which opposite ends of a flexible cable are secured. The male connector half includes a generally cylindrical front plug with a radially-inwardly compressible lock ring of slightly larger uncompressed outer diameter than that of the plug. The plug closely fits into a mating cylindrical socket bore in the female connector half which radially compresses the lock ring during insertion of the plug therein. An annular lock ring groove inside the socket bore is configured to receive the outer portion of the lock ring which lock ring radially expands therein to removably retain the male and female connector halves together.

Various connectors are used on jewelry such as necklaces and bracelets. Such connectors typically comprise a pair of loops, one closeable and one not, affixed to opposite ends of a braided or twisted chain. The closeable loop comprises an inner solid cross-section C-shaped member with a tab affixed at an end thereof and an outer tubular cross-section C-shaped member inside of which the inner member slides. The members are biased by a small spring within the outer C-shaped member to a closed position wherein the two members form a closed loop. When the tab is pressed, the C-shaped members slide relative to one another to a position wherein the openings thereof align to allow the other closed loop to fit therein and be retained thereby upon release of the tab.

SUMMARY OF THE INVENTION

The invention is a flexible loop assembly comprising a connector, a flexible band, and a pair of locking mechanisms. The connector includes a first connector half having a front connection portion and a rear attachment portion. The connector further includes a second connector half having a front connection portion and a rear attachment portion. The front connection portions are releasibly or permanently interconnectable. The band includes a pair of end portions interconnected by a center portion. The end portions are retained to the respective rear attachment portions of the first and second connector halves using the respective locking mechanisms. When the front connection portions of the first and second connector halves are interconnected, a closed loop is formed such as for retaining keys or binding sheets of paper.

The rear attachment portions of the first and second connector halves and the end portions of the band preferably comprise mating pairs of end plugs and bores, the end plugs being insertable to closely fit within the respective bore. The bores are preferably disposed in the respective rear attachment portions of the first and second connector halves with the end plugs being the end portions of the band. The locking mechanism therein comprises an adhesive applied between the mating pairs of plugs and bores.

Preferably, at least one of the end plug and bore of each mating pair includes at least one annular groove. The adhesive applied between the mating pairs of plugs and bores then fills the the annular grooves hardening to form a solid lock ring. The annular groove, the adhesive, and the lock ring comprise the locking mechanism. Preferably both the end plugs and the bores of each mating pair of plugs and bores include at least one annular groove providing a lock ring with improved retaining. In such case, the annular grooves of each of mating pair are substantially radially-aligned such that adhesive applied between the mating pair fills the annular grooves hardening to form respective solid lock rings. The annular grooves, the adhesive, and the lock rings comprise the respective locking mechanisms.

The band can be made of a stranded cable having a rough stranded exterior. The adhesive is applied between the end portions of the flexible band and the respective mating bore filling the annular grooves and hardening to form a solid lock ring. The annular groove, the adhesive, the rough stranded exterior of the cable, and the lock ring comprise the locking mechanism. The cable can be covered by an outer jacket comprising a thin flexible plastic tube which closely fits over the cable.

THE DRAWINGS

Figure 2:
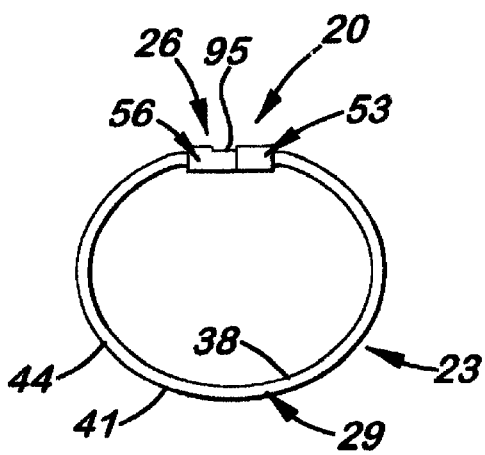
Figure 3:
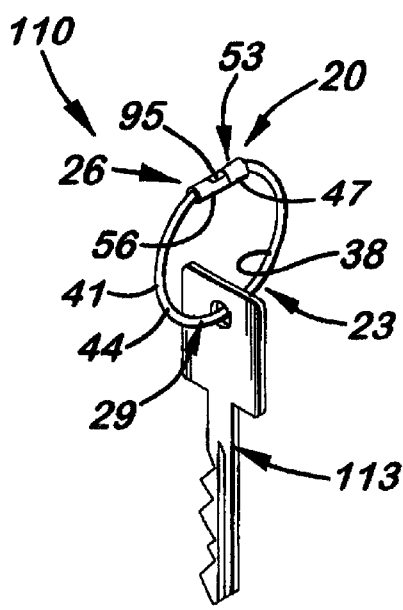
Figure 4:
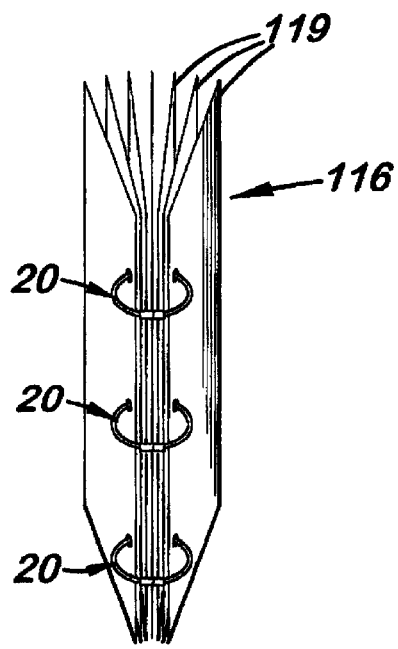
Figure 5:
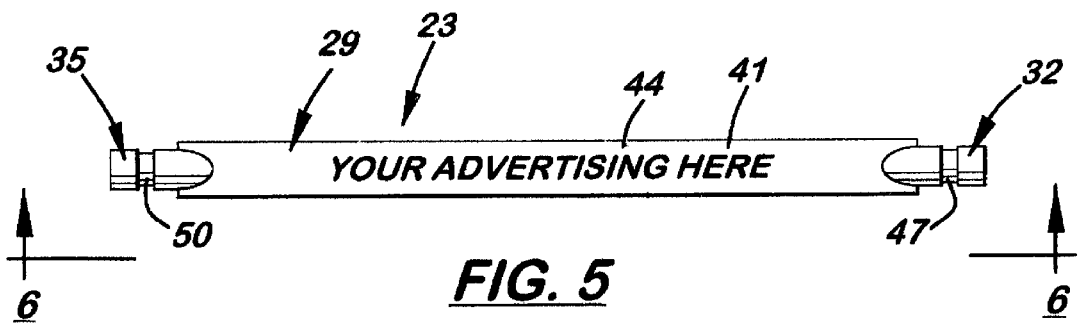
Figure 6:
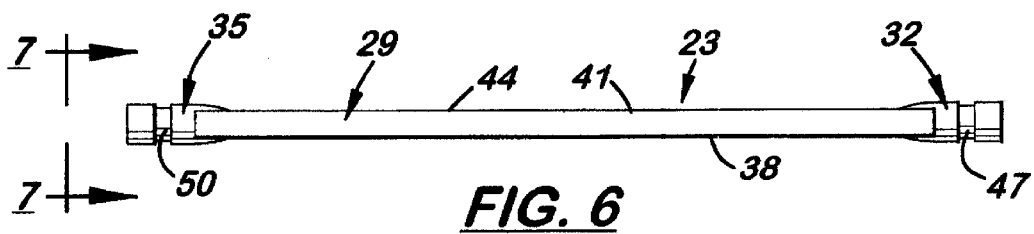
Figure 7:
Figure 8:
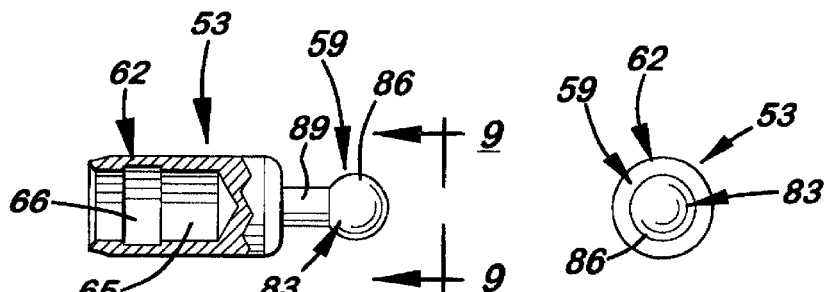
Figure 9:
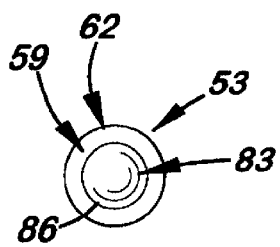
Figure 11:
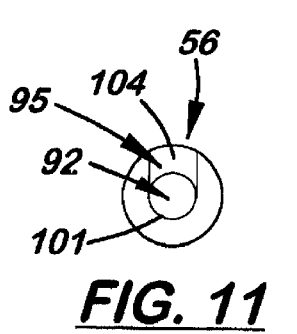
Figure 10:
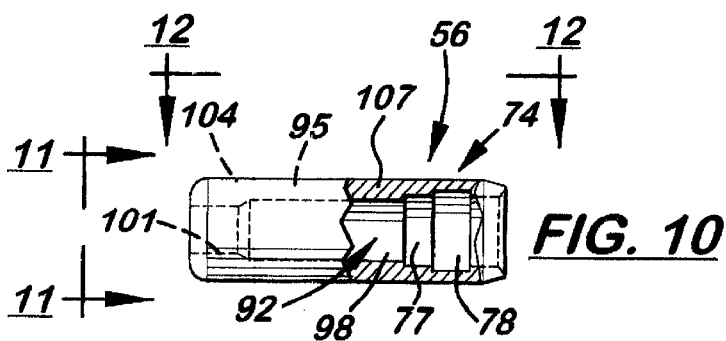

The best mode presently contemplated for carrying out the invention is illustrated in the accompanying drawings, in which:

FIG. 1 is a front elevational view of a closeable loop assembly according to the invention, the loop assembly being shown in an open position with mating first and second connector halves attached at opposite ends of a flexible band;

FIG. 2, a front elevational view of the loop assembly with the respective connector halves connected together;

FIG. 3, a perspective view to a reduced scale of the loop assembly with a key attached to form a key chain;

FIG. 4, a perspective view to a reduced scale of a plurality of loop assemblies holding together loose sheets of paper to form a paper binder;

FIG. 5, a top plan view to an enlarged scale of the band showing the end plugs and the flat center portion with advertising logo;

FIG. 6, a front elevational view taken on the line 6—6 of FIG. 5 showing the thin profile of the center portion of the band;

FIG. 7, a side elevational view taken on the line 7—7 of FIG. 6 showing the round cross-section of the connectors and the rectangular cross-section of the center portion of the band;

FIG. 8, a side elevational view to an enlarged scale of the first connector half in partial longitudinal cross-section showing the socket for connecting the band;

FIG. 9, a front elevational view taken on the line 9—9 of FIG. 8 showing the ball stud of the first connector half;

FIG. 10, a side elevational view to an enlarged scale of the second connector half in partial longitudinal cross-section showing the socket for connecting the band;

FIG. 11, a rear elevational view taken on the line 11—11 of FIG. 10 showing the bore and slot of the second connector half;

FIG. 12, a top plan view taken on the line 12—12 of FIG. 10, showing the bore and slot of the second connector half;

FIG. 13, a side elevational view of the first and second connector halves in partial longitudinal cross-section shown in an initial connecting position, with the end plugs of the band adhesively secured in the respective sockets of the connectors to form respective locking rings;

FIG. 14, a side elevational view of the first and second connector halves corresponding to FIG. 13, but shown in an intermediate connecting position; and FIG. 15, a side elevational view of the first and second connector halves corresponding to FIGS. 13 and 14, but shown in a final connecting position.

DETAILED DESCRIPTION OF THE ILLUSTRATED EMBODIMENTS

Referring to FIGS. 1 and 2, therein is shown a flexible loop assembly according to the invention, flexible loop assembly 20, which comprises a flexible band 23 and a connector 26.

As best shown in FIGS. 5–7, band 23 includes a flattened central portion 29 which interconnects a pair of end plugs 32 and 35. Central portion 29 includes a pair of elongate wide faces 38 and 41 which can have advertising or decorative logos such as logo 44 molded or imprinted thereon. End plugs 32 and 35 are of circular cross-section and flare into central portion 29 of band 23. Each of end plugs 32 and 35 include a respective annular groove 47 and 50.

Connector 26 comprises respective first and second connector halves 53 and 56 which are interconnectable such that flexible loop assembly 20 can form a loop as shown in FIG. 2. 31. First connector half 53 comprises a front connection portion 59 and a rear band attachment portion 62 having a socket 65 into which end plug 32 closely fits. Socket 65 includes an annular groove 66. End plug 32 is secured within socket 65 using an adhesive such as epoxy or other hardening adhesive which forms a solid ring 68 between annular grooves 47 and 66 to mechanically as well as adhesively lock first connector half 53 to band 23.

Second connector half 56 comprises a front connection portion 71 and a rear band attachment portion 74 having a socket 77 into which end plug 35 closely fits. Socket 77 includes an annular groove 78. End plug 35 is secured within socket 77 using an adhesive such as epoxy or other hardening adhesive which forms a solid ring 80 between annular grooves 50 and 78 to mechanically as well as adhesively lock second connector half 56 to band 23.

Front connection portion 59 of first connector half 53 in-cludes a ball stud 83 comprising a ball 86 and a shaft 89. Front connection portion 71 of second connector half 56 includes a bore 92 and a slot 95. Bore 92 includes a large diameter portion 98 of sufficient size to pass ball 86 and a reduced diameter portion 101 of sufficient size to pass shaft 89 but which does not pass ball 86. Slot 95 extends into bore 92 and includes a straight portion 104 which terminates in a circular portion 107. Circular portion 107 is of a sufficient diameter to pass ball 86. Straight portion 104 is of sufficient width as to pass shaft 89.

As shown in FIGS. 13–15, first connector half 53 removably connects to second connector half 56 by inserting ball 86 through circular portion 107 of slot 95 into large diameter portion 98 of bore 92. First connector half 53 is then moved relative to second connector half 56 in the direction of arrow "A" (FIG. 13). When ball 86 contacts and is stopped from further movement by reduced diameter portion 101 of bore 92, first connector half 53 is pivoted about ball 86 as shown by arrow "B" (FIG. 14). Shaft 89 then coaxially fits within reduced diameter portion 101 of bore 92 (FIG. 15). The procedure is reversed to disconnect first connector half 53 from second connector half 56.

Loop assembly 20 can be used as a key chain 110 wherein one or more keys 113 are retained thereon (FIG. 3). Multiple loop assemblies 20 can be used as a ring binder 116 to hold a plurality of loose leaf pages 119 together (FIG. 4). The connector 26 apart from band 23 can be used for connecting together the ends of jewelry chains such as on necklaces and bracelets (not shown) and practically anywhere a reclosable, flexible loop is required.

While the front connection portions 59 and 71 of first and second connector halves 53 and 56 are shown to be of the ball-in-slot type having respective front connection portions 59 and 71 interconnectable by means of one thereof including ball stud 83 and the other thereof including a mating bore 92 and slot 95, they can be of any type known in the industry.

For example, a twist-lock connector of the type disclosed in the '768 patent of B. E. Tudor would have the front connection portions 59 and 71 of the respective first and second connector halves 53 and 56 being interconnectable by means of one thereof being generally hollow provided with an inwardly directed locking shoulder. The other thereof would terminate in an enlarged semi-circular head adapted to be inserted within the generally hollow front connection portion past the locking shoulder and rotatably twisted to lock. Likewise, other twist-lock connector types such as utilizing an L-shaped slot in the generally hollow portion and a radially-extending pin in the portion insertable into the hollow.

A plug-in-socket type connector of the type disclosed in the '049 patent of this inventor and similar to the '855 patent also of this inventor would have the respective front connection portions 59 and 71 interconnectable by means of one thereof including a longitudinally extending plug having an annular slot. The other thereof would include a mating bore having an annular slot. A lock ring would be retained in one of the slots and releasibly retainable in the other.

A crimp type connector of the type disclosed in the '457 patent of this inventor would have the respective front connection portions 59 and 71 interconnectable by means of one thereof being generally hollow. The other would be adapted to be inserted within the generally hollow front connection portion and terminate in an enlarged boss. The front connection portions would be adapted to be crimped together such that the enlarged boss makes a positive connection to form an inseparable closed loop.

Other flexible members or bands can be used which utilize the same locking mechanism. For example, the flexible band can be made of a flexible stranded cable such as the metal type used on key chains. The cable has a rough stranded exterior due to being made of individual wire strands which are twisted or braided together. The adhesive is applied between the end portions of the cable and the respective mating bore, filling the one or more annular grooves in the bore with adhesive. The adhesive hardens in each annular groove to form one or more solid lock rings. The rough stranded exterior simulates the annular ring in the ends of the previously discussed band to lock the connector halves thereto in conjunction with the annular grooves within the bores of the respective first and second connector halves. A thin flexible outer jacket such as comprising a plastic tube can be included which closely fits about the cable. The tube is thin and tight-fitting such that the rough stranded exterior of the cable deforms the tube for locking to the first and second connector halves similarly to when the tube is not used.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A flexible loop assembly, comprising:
    a connector which includes a first connector half having a front connection portion and a rear attachment portion, and a second connector half having a front connection portion and a rear attachment portion;
    a flexible band which includes a pair of end portions and an interconnecting center portion, said end portions being mateable with the respective rear attachment portions of said first and second connector halves;
    a pair of locking mechanism, one being for retaining each of said end portions to said respective rear attachment portions;
    wherein said front connection portions are interconnectable such that said first and second connector halves and said band form a closed loop; and
    wherein said rear attachment portions of the respective first and second connector halves and the respective end portions of said band comprise mating pairs of end plugs and bores, said end plugs being insertable to closely fit within the respective bore, and wherein said locking mechanisms comprise an adhesive applied between said mating pairs of plugs and bores.

2. A loop assembly according to claim 1, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

3. A loop assembly according to claim 1, wherein at least one of the end plug and bore of each mating pair includes at least one annular groove, the adhesive applied between said mating pairs of plugs and bores filling said annular grooves and hardening to form a solid lock ring, said annular grooves, said adhesive, and said lock rings comprising the respective locking mechanisms.

4. A loop assembly according to claim 3, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

5. A loop assembly according to claim 3, wherein the center portion of the band is of a flattened cross-section having a wide upper surface and lower surface, and a pair of narrow side surfaces.

6. A loop assembly according to claim 5, wherein at least one of the upper and lower surfaces includes an indicia.

7. A loop assembly according to claim 3, wherein the connector is of a type wherein the front connection portions of the respective first and second connector halves are interconnectable by one thereof including a ball stud and the other thereof including a mating bore and slot.

8. A loop assembly according to claim 3, wherein the connector is of a type wherein the front connection portions of the respective first and second connector halves are interconnectable by one thereof being generally hollow and provided with an inwardly directed locking shoulder, and the other thereof terminating in an enlarged semi-circular head adapted to be inserted within said generally hollow front connection portion past said locking shoulder and rotatably twisted to lock.

9. A loop assembly according to claim 3, wherein the connector is of a type wherein the front connection portions of the respective first and second connector halves are interconnectable by one thereof including a longitudinally extending plug having an annular groove, and the other thereof including a mating bore having an annular groove, and a lock ring which is retained in one of said grooves and releasibly retainable in the other thereof.

10. A loop assembly according to claim 3, wherein the connector is of a type wherein the front connection portions of the respective first and second connector halves are interconnectable by one thereof being generally hollow, and the other thereof adapted to be inserted within said generally hollow front connection portion and terminating in an enlarged boss, said front connection portions being adapted to be crimped together such that said enlarged boss makes a positive connection therebetween, said loop assembly which forms an inseparable closed loop.

11. A loop assembly according to claim 3, wherein both the end plugs and the bores of each mating pair include at least one annular groove, said annular grooves of each of said mating pairs being substantially radially-aligned such that adhesive applied between said mating pairs of plugs and bores fills said annular grooves hardening to form respective solid lock rings, said annular grooves, said adhesive, and said lock rings comprising the locking mechanisms.

12. A loop assembly according to claim 11, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

13. A loop assembly according to claim 11, wherein at least one of the end plug and bore of each mating pair includes at least one annular groove, the adhesive applied between said mating pairs of plugs and bores filling said annular grooves and hardening to form a solid lock ring, said annular grooves, said adhesive, and said lock rings comprising the respective locking mechanisms.

14. A loop assembly according to claim 13, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

15. A loop assembly according to claim 11, wherein the center portion of the band is of a flattened cross-section having a wide upper surface and lower surface, and a pair of narrow side surfaces.

16. A loop assembly according to claim 11, wherein at least one of the upper and lower surfaces includes an indicia.

17. A loop assembly according to claim 11, wherein the connector is of a type wherein the front connection portions of the respective first and second connector halves are interconnectable by one thereof including a ball stud and the other thereof including a mating bore and slot.

18. A loop assembly according to claim 11, wherein the connector is of a type wherein the front connection portions of the respective first and second connector halves are interconnectable by one thereof being generally hollow and provided with an inwardly directed locking shoulder, and the other thereof terminating in an enlarged semi-circular head adapted to be inserted within said generally hollow front connection portion past said locking shoulder and rotatably twisted to lock.

19. A loop assembly according to claim 11, wherein the connector is of a type wherein the front connection portions of the respective first and second connector halves are interconnectable by one thereof including a longitudinally extending plug having an annular groove, and the other thereof including a mating bore having an annular groove, and a lock ring which is retained in one of said grooves and releasibly retainable in the other thereof.

20. A loop assembly according to claim 11, wherein the connector is of a type wherein the front connection portions of the respective first and second connector halves are interconnectable by one thereof being generally hollow, and the other thereof adapted to be inserted within said generally hollow front connection portion and terminating in an enlarged boss, said front connection portions being adapted to be crimped together such that said enlarged boss makes a positive connection therebetween, said loop assembly which forms an inseparable closed loop.

21. A loop assembly according to claim 3, wherein the respective rear attachment portions of the first and second connector halves each include one of the bores, and wherein the end plugs comprise the end portions of the flexible band.

22. A loop assembly according to claim 21, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

23. A loop assembly according to claim 21, wherein the respective bores each include the at least one annular groove.

24. A loop assembly according to claim 23, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

25. A loop assembly according to claim 23, wherein at least one of the end plug and bore of each mating pair includes at least one annular groove, the adhesive applied between said mating pairs of plugs and bores filling said annular grooves and hardening to form a solid lock ring, said annular grooves, said adhesive, and said lock rings comprising the respective locking mechanisms.

26. A loop assembly according to claim 25, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

27. A loop assembly according to claim 23, wherein the center portion of the band is of a flattened cross-section having a wide upper surface and lower surface, and a pair of narrow side surfaces.

28. A loop assembly according to claim 23, wherein at least one of the upper and lower surfaces includes an indicia.

29. A loop assembly according to claim 23, wherein the connector is of a type wherein the front connection portions of the respective first and second connector halves are interconnectable by one thereof including a ball stud and the other thereof including a mating bore and slot.

30. A loop assembly according to claim 23, wherein the connector is of a type wherein the front connection portions of the respective first and second connector halves are interconnectable by one thereof being generally hollow and provided with an inwardly directed locking shoulder, and the other thereof terminating in an enlarged semi-circular head adapted to be inserted within said generally hollow front connection portion past said locking shoulder and rotatably twisted to lock.

31. A loop assembly according to claim 23, wherein the connector is of a type wherein the front connection portions of the respective first and second connector halves are interconnectable by one thereof including a longitudinally extending plug having an annular groove, and the other thereof including a mating bore having an annular groove, and a lock ring which is retained in one of said grooves and releasibly retainable in the other thereof.

32. A loop assembly according to claim 23, wherein the connector is of a type wherein the front connection portions of the respective first and second connector halves are interconnectable by one thereof being generally hollow, and the other thereof adapted to be inserted within said generally hollow front connection portion and terminating in an enlarged boss, said front connection portions being adapted to be crimped together such that said enlarged boss makes a positive connection therebetween, said loop assembly which forms an inseparable closed loop.

33. A loop assembly according to claim 21, wherein the band comprises a stranded cable having a rough stranded exterior, the adhesive applied between the end portions of said band and the respective mating bores filling said annular grooves and hardening to form a solid lock ring, said annular grooves, said adhesive, said rough stranded exterior, and said lock rings comprising the respective locking mechanisms.

34. A loop assembly according to claim 33, wherein the band further comprises an outer jacket comprising a thin flexible plastic tube which closely fits over the stranded cable such that the rough stranded exterior of the flexible cable deforms said tube for effective retention by the respective locking mechanisms.

35. A loop assembly according to claim 33, wherein the bores are disposed extending into the rear attachment portions of the first and second connector halves, the band is of circular cross-section comprising a flexible member of circular cross-section chosen from the group consisting of tubes and rods, and the mating plugs comprise respective end portions of said flexible member.

36. A loop assembly according to claim 23, wherein the connector is of a type wherein the front connection portions of the respective first and second connector halves are interconnectable by one thereof including a ball stud and the other thereof including a mating bore and slot.

37. A loop assembly according to claim 35, wherein the connector is of a type wherein the front connection portions of the respective first and second connector halves are interconnectable by one thereof being generally hollow and provided with an inwardly directed locking shoulder, and the other thereof terminating in an enlarged semi-circular head adapted to be inserted within said generally hollow front connection portion past said locking shoulder and rotatably twisted to lock.

38. A loop assembly according to claim 35, wherein the connector is of a type wherein the front connection portions of the respective first and second connector halves are interconnectable by one thereof including a longitudinally extending plug having an annular groove, and the other thereof including a mating bore having an annular groove, and a lock ring which is retained in one of said grooves and releasibly retainable in the other thereof.

39. A loop assembly according to claim 35 wherein the connector is of a type wherein the front connection portions of the respective first and second connector halves are interconnectable by one thereof being generally hollow, and the other thereof adapted to be inserted within said generally hollow front connection portion and terminating in an enlarged boss, said front connection portions being adapted to be crimped together such that said enlarged boss makes a positive connection therebetween, said loop assembly which forms an inseparable closed loop.

* * * * *